United States Patent [19]

Verge

[11] 4,453,728

[45] Jun. 12, 1984

[54] SPLASH GUARD

[75] Inventor: Cyril A. Verge, Halifax, Canada

[73] Assignee: Louis Arthur Verge, Fall River, Canada

[21] Appl. No.: 397,193

[22] Filed: Jul. 12, 1982

[30] Foreign Application Priority Data

Jul. 29, 1981 [CA] Canada ................................... 382810

[51] Int. Cl.³ .............................................. B62B 9/16
[52] U.S. Cl. ................................ 280/154.5 R; 16/305; 403/111
[58] Field of Search ......................... 280/154.5 R, 154; 267/155, 156; 403/111, 146; 16/282, 283, 285, 305; 49/386

[56] References Cited

U.S. PATENT DOCUMENTS

| 219,653 | 9/1879 | Rowe | 16/283 |
|---|---|---|---|
| 484,200 | 10/1892 | Held et al. | 16/285 |
| 709,618 | 9/1902 | Valentine | 16/283 |
| 787,999 | 4/1905 | Valentine | 16/283 |
| 957,603 | 5/1910 | Ellis | 16/285 |
| 1,236,536 | 8/1917 | Boyd | 16/285 |
| 3,899,150 | 8/1975 | Racquet | 403/111 X |
| 3,954,281 | 5/1976 | Juergens | 280/154.5 R |
| 4,103,918 | 8/1978 | Salden | 280/154.5 R |

Primary Examiner—Joseph F. Peters, Jr.
Assistant Examiner—Michael Mar
Attorney, Agent, or Firm—Browdy and Neimark

[57] ABSTRACT

A splash guard or mud guard for vehicles. The assembly has a lower section pivotally secured to an upper section and includes oppositely wound axially spaced helical springs with a mechanism to independently adjust the tension of the springs which permits the lower flap section to pivot equally in either forward or rearward direction under equal tension.

7 Claims, 7 Drawing Figures

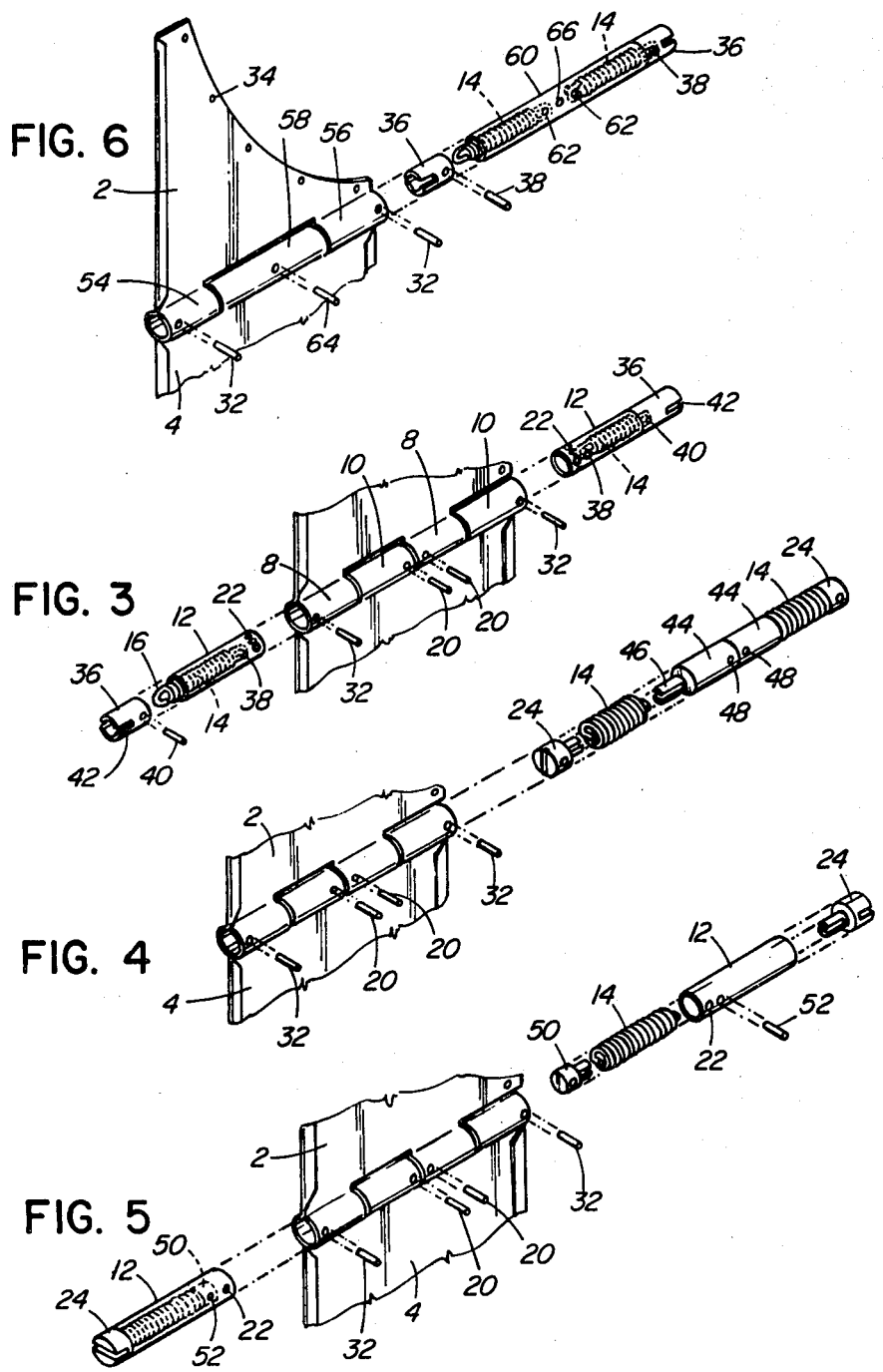

SPLASH GUARD

The present invention relates to a splash guard or mud guard for motor vehicles which acts to prevent damage to the underside and to the exterior finish of the vehicle caused by stones and gravel thrown up by the tires during movement. The splash guard of the invention also reduces the amount of water, dirt, stones and other debris thrown rearwardly during movement of the vehicle and which might cause damage to a following vehicle or pedestrians in addition to being bothersome and even dangerous to other drivers.

Various devices of this general type are known and a device commonly available for use on automobiles consists of an upper section which is of stainless steel or other metal construction and which is secured to the vehicle in a position behind a tire, and a lower portion which is made from a material permitting some flexibility such as rubber or plastic, the upper and lower portions usually being secured together by rivets or the like. Such a known device generally works efficiently but has the disadvantage of being susceptible to damage as a result of the lower portion being disfigured or actually torn away upon contact with curbs or other obstacles particularly when the rubber or plastic material is in a state of deterioration. Moreover, when used in extremely cold weather, the lower portion loses flexibility and becomes more subject to cracking and breaking as a result of contact with road obstacles.

Other types of splash guards presently in use are made completely from metal or rubber and the disadvantage with the units made completely of metal is that they are subject to bend upon contact with curbs and other obstacles encountered during use. This is particularly true when the splash guards fitted on a vehicle are oversized in an effort to provide maximum protection. Splash guards made completely of rubber or plastic material are more durable although they are not as attractive, and they too, are subject to damage and warping, and this takes away from the overall appearance of the vehicle.

The present invention avoids the prior art and disadvantages by providing a splash guard of attractive appearance and durable construction and which consists of an upper section for securement to a vehicle, and a lower flap section pivotally interconnected to the upper section enabling the lower section to pivot either forwardly or rearwardly upon contact with an obstacle to prevent damage to the guard.

The pivoting interconnection of the upper and lower sections includes counteracting biasing means in the form of springs which are independently adjustable with regard to tension thus enabling control of pivoting action in either forward or rearward direction.

DISCUSSION OF THE PRIOR ART

Vehicle splash guards having pivotally interconnected upper and lower sections are known and U.S. Pat. No. 4,103,918—L. Salden—granted Aug. 1, 1978, discloses and claims a fender flap having upper and lower sections which are pivotally secured together and a spring is provided to hold the sections in normally aligned relationship. Upon encountering an obstacle, the lower flap section is free to pivot to some extent in either direction with respect to the upper section. However due to the nature of the single non-adjustable spring used in the device of the patent, the lower section has more freedom to move in one direction than in the other, as opposed to applicant's double spring concept enabling identical uniformly pivoting movement. The arrangement in the patent permits only limited rotational movement of the lower flap without undue stress being placed on the single spring, whereas the present invention permits unlimited pivoting movement of the lower flap in either direction with minimum spring fatigue or damage. Additionally and in the arrangement of the patent the spring always maintains the lower flap section in more or less planar orientation with the top flap section, whereas in the present invention and as a result of the double spring concept it is possible during assembly to orient the lower flap section at an angle to the upper section to enable the lower section to be positioned at a depending angle of maximum effectiveness regardless of the angle at which the upper section is secured to the vehicle while still maintaining equal and opposite uniform pivoting tension in the lower section.

THE PRESENT INVENTION

The main object of the present invention is to provide a splash or mud guard assembly which is so constructed to permit pivotal movement of component parts upon contact with obstacles to minimize any damage to the structure which would impair its effectiveness and overall appearance.

A further object is to provide a mud and splash guard comprising pivotally interconnected upper and lower sections and including a pair of counteracting biasing means and means to independently adjust the tension of the biasing means.

More specifically, the present invention relates to a splash guard or mud guard for vehicles comprising an upper section and a lower section pivotally secured to the upper section, the lower edge of the upper section and the upper edge of the lower section having a plurality of cylindrical and hollow interfitting hinge barrels providing an axial opening therethrough, and a pair of oppositely wound helical springs axially spaced within the said axial opening, one end of each spring being secured against rotation within hinge barrels of one section with the other end of each spring being secured against rotation within hinge barrels of the other section, and means to adjust the tension of the springs.

BRIEF DESCRIPTION OF ACCOMPANYING DRAWINGS

FIG. 3 is a view similar to FIG. 2, showing a further embodiment of the inventive concept;

FIG. 4 is a view similar to FIG. 2 illustrating another embodiment of the inventive concept;

FIG. 5 is a view similar to FIG. 2, illustrating a still further embodiment of the present invention;

FIG. 6 is a view similar to FIG. 2 showing yet another embodiment of the present invention.

DETAILED DESCRIPTION OF DRAWINGS

Figure 1:
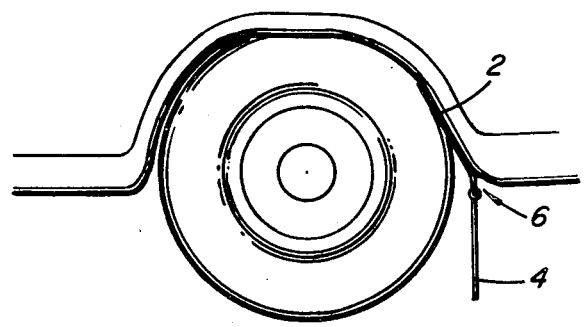
FIG. 1 illustrates in side view a splash guard in accordance with the present invention positioned behind the wheel of a vehicle.

Reference will now be had to the accompanying drawings in detail, wherein like reference numerals refer to like parts.

With reference to FIG. 1, the present invention consists of an upper section 2 pivotally secured to a lower flap section 4, secured behind the front or rear wheel.

The upper and lower sections 2 and 4 respectively are pivotally and hingedly interconnected as shown at 6 in FIG. 1, and the following Figures illustrate various embodiments of hinging arrangements within the present inventive concept.

Figure 2:
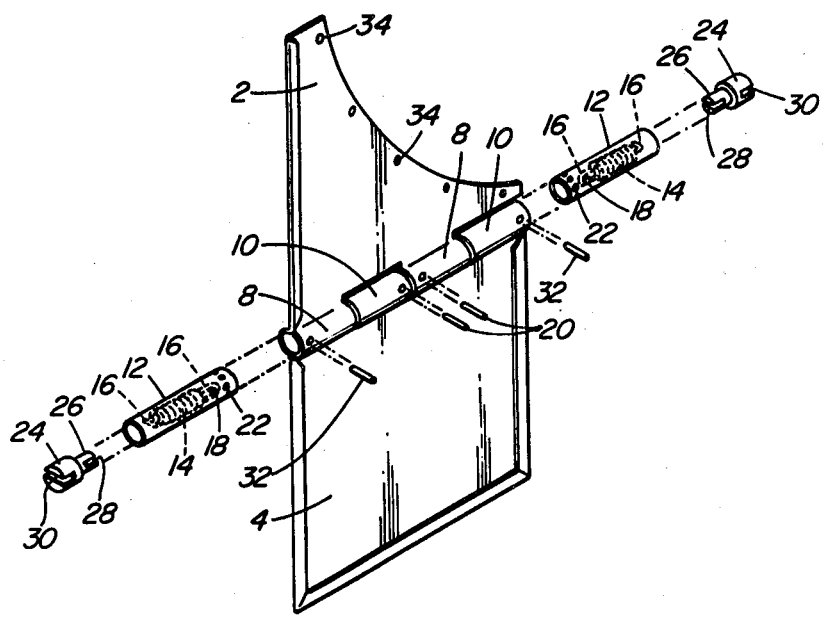
FIG. 2 is an enlarged partially exploded view showing the relationship of component parts according to one embodiment of the invention.

With reference to FIG. 2, the upper section 2 is provided with hollow cylindrical hinge barrels 8 which interfit with hollow cylindrical hinge barrels 10 provided along the upper edge of the lower flap section 4. When the hinge barrels 8 and 10 are in interfitting relationship they provide an aligned axial opening (not specifically numbered) therethrough. While FIG. 2 shows two hinge barrels carried by each of the sections 2 and 4, more or less hinge barrels can be provided as desired as will be understood from the following description.

The interfitting hinge barrels are held in pivoting relationship by the insertion of two hollow cylindrical sleeves 12, each of which carries a helical spring 14 having ends which are looped as shown at 16. The inner ends of the springs 14 are held against rotation within their respective sleeves by pins or rivets 18 which pass through drilled openings (not numbered) in the sleeves and through the loops 16 provided at the inner ends of the springs. The sleeves themselves are held against rotation in their respective hinge barrels by pins or rivets 20 which pass through the drilled openings 22 provided in the sleeves. For purposes of clarity, the drilled openings within the hinge barrels 8, 10 are shown but not specifically numbered but it is believed that the relationship and the positioning of pins or rivets therein is self-evident.

The outer ends of the sleeves 12 are closed by generally cylindrical solid plugs 24 which have inner portions 26 which snugly fit within the sleeves 12, and main body portions which snugly fit within the outer ends of the respective hinge barrels. The inner portions 26 of each solid plug 24 is slotted as shown at 28 to receive the loop 16 formed at the outer end of each spring 14. The outer surface of each plug 24 is also provided with a slot 30 whereby the tension of the helical springs 14 can be adjusted by rotation of the plugs 24 by using a screw driver or similar tool. When the desired spring tension is achieved, pins or rivets 32 are then slid into position through the drilled opening at the outer ends of the hinge barrels and through the slots 30 to prevent undesired further rotation of the plugs.

When positioned, the springs 14 are oppositely wound having configurations which are helically reversed and when tensioned one of the springs acts to pivot the lower section 4 in one direction relative to the upper section 2 while the other spring acts to urge pivoting in opposite direction. Thus, the two springs counteract each other and during normal use hold the lower section 4 in opposite equally tensioned relationship with the upper section 2.

This arrangement of opposite and counteracting tension permits the lower section 4 to pivot equally in either direction with respect to the upper section.

With reference to FIG. 2, openings 34 may be provided in the top section 2 to receive screws or the like to facilitate securement of the section to a vehicle.

The springs 14 are preferably of stainless steel and the pins and sleeves are also perferably of metal. The remaining components may be made of any suitable material such as plastic or metal material.

FIG. 3 illustrates an arrangement very similar to that shown in FIG. 2. In FIG. 3, however, the outer cylindrical end plugs 36 are hollow and are the same diameter as sleeves 12 to be snugly received within the axial opening provided through the hinge barrels 8 and 10. For assembly, pins 38 are inserted in the sleeves 12 and through the loops 16 provided in the inner ends of the springs 14, and pins 40 are inserted in the drilled openings in the hollow plugs 36 and through the loops in the outer ends of the springs. The ends of pins 38 and 40 are flush with the outer surface of the sleeves 12 and plugs 36 for reception of the assemblies within the hinge barrels. These assemblies (one of which is shown to the right in FIG. 3) are slid into the axial opening and pins 20 inserted in drilled openings 22 to secure the inner ends of the sleeves and springs against rotation. To adjust tension of the springs, a screw driver or like tool is then inserted into the slots 42 provided in the hollow plugs 36 and when the desired tension is received, pins 32 are then inserted and passed through slots 42 to prevent any further undesired rotation of the springs.

In the arrangement shown in FIG. 4, two central solid pivot pins 44 are provided which have oppositely axially extending slotted projections 46 to receive and hold the looped inner ends of the springs 14. The assembly as shown to the right in FIG. 4 is received within the axial opening provided within the hinge barrels and pins 20 are inserted through drilled openings 48 in the pivot pins 44 to hold the arrangement together. Tension adjustments are made in a manner similar to that described above.

The arrangement shown in FIG. 5 is again generally similar to that explained above with respect to FIG. 2, but includes inner plugs 50 which hold the inner ends of the springs against rotation within sleeves 12 by the insertion of pins 52. The pivot pin assemblies (one of which is shown to the left in FIG. 5) are then slid into the axial opening and the inner ends of the sleeves held against rotation with respect to the respective hinge barrels by pins 20. The tension of the springs is then adjusted by rotating outer plugs 24 and when the final tension is obtained, pins or rivets 32 are then inserted.

FIG. 6 illustrates an embodiment wherein the upper section has two hinge barrels 54 and 56 with the lower section having only a single central hinge barrel 58. The pivot pin assembly consists of a single elongate sleeve 60 which receives two springs 14 as shown. The inner ends of the springs are held against rotation within the sleeve 60 by pins 62. The end plugs 36 are secured to the loops 16 formed in the outer ends of the springs by means of pins 38 and the pivot pins/spring assembly is then inserted into the axial opening provided in the hinge barrels. Sleeve 60 is held against rotation within the hinge barrel 58 by means of pin 62 which passes through hinge barrel 58 as shown and through hole 64 in sleeve 60. Using the slotted end plugs 36 the tension of the springs is adjusted and pins 32 positioned.

The pins after assembly may be riveted in position or in the case that the hinge barrels and the springs are of metal material, the ends of the pins may simply be held in position by solder or by welding. Although not specifically shown in the drawings, all of the pins which pass completely through the hinge barrels could be in the form of small bolts held in position by nuts or similar arrangement.

Figure 7:
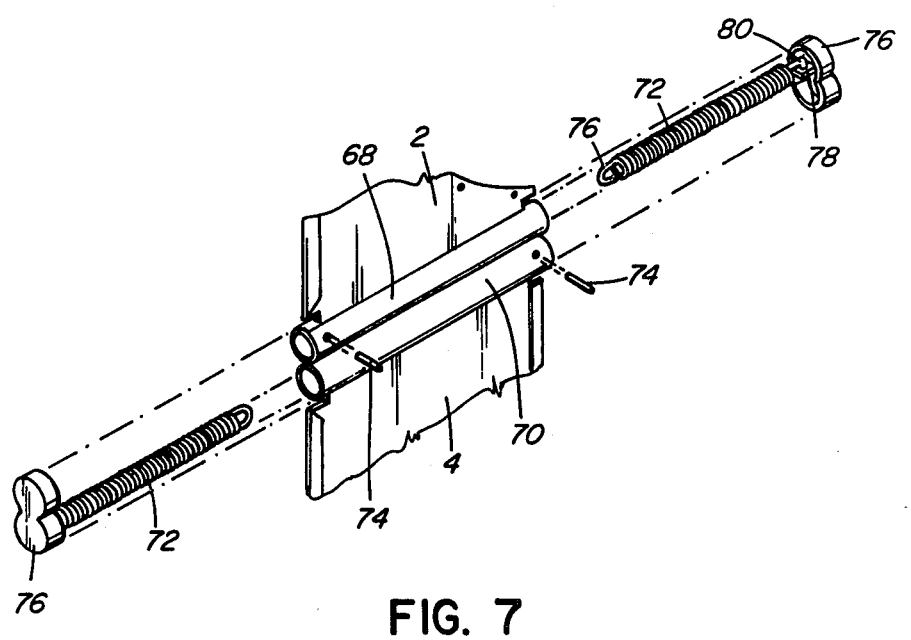
FIG. 7 is a perspective view of a variation of the present invention in disassembled form.

FIG. 7 illustrates a variant of the present invention and consists of upper and lower sections 2 and 4 respectively. The lower edge of the upper section and the upper edge of the lower section are provided with hinge barrels 68 and 70 respectively which receive helical springs 72 which have reversed helical configurations. One end of the upper spring 72 is held against rotation within hinge barrel 68 by means of a pin 74 which passes through the hinge barrel and through a loop 76 provided at the end of the spring. The opposite end of the other spring 72 to be positioned within hinge barrel 70 is secured against rotation in similar manner by pin 74. End caps 76 then fit over the ends of the adjacently positioned hinge barrels to provide a pivoting arrangement. The end caps 76 are provided with flanges 78 having openings (not numbered) therein to receive hooks 80 provided on the other ends of the springs 72. To adjust the tension of a spring the end cap to which the spring is secured is pulled outwardly and then rotated to increase or decrease tension as desired and when this is achieved the end cap is then fitted over the ends of adjacent hinge barrels where it will be snugly held under spring tension.

The accompanying Figures illustrate an assembly primarily designed for securement to an automobile, but it will be appreciated that the inventive concept is also applicable to larger vehicles such as trucks with the assembly being of greater size. The structure is adaptable to positioning behind the rear single or dual wheels of a truck or could be of a size to extend completely across the rear of a truck behind the rear wheels to obtain maximum benefit.

The upper flap section 2 may either be straight as shown in FIGS. 2 through 7, or may be provided with an angled portion as shown in FIG. 1 to hold the lower section in a position of maximum effectiveness. However the present device may also be assembled whereby the lower section may be angularly oriented with respect to the upper section to be positioned at an effective angle during use regardless of the angle of positioning of the upper section on a vehicle while still providing equally tensioned pivoting in either direction. This may be conveniently accomplished for example by providing sleeves 12 (see FIG. 2) with a series of drilled openings similar to opening 22 around the sleeves for selectively receiving pins 20. During assembly the upper and lower sections are oriented in their desired relationship and with the sleeves 12 in position within the axially openings the pins 20 are inserted into the aligned openings 22 in the sleeves. The springs are then tensioned and held by pins 32 in the manner described above.

Although not specifically shown in the drawings a similar orientation of the upper and lower sections is possible with the embodiments of FIGS. 3 and 5 by providing a series of circumferential holes 22 (not specifically shown) in sleeves 12 to selectively receive pins 20. In FIG. 4 this adjustment is possible by providing holes 48 as a series of holes circumferentially around pivot pins 44.

I claim:

1. A splash guard or mud guard for vehicles comprising
an upper section, and a lower section pivotally secured to the upper section,
the lower edge of the upper section and the upper edge of the lower section each having a pair of cylindrical hollow hinge barrels, the hinge barrels of one section interfitting with the hinge barrels of the other section to provide an axial opening therethrough,
and a pair of axially aligned hollow cylindrical sleeves positioned within the axial opening with each sleeve extending from a hinge barrel of one section into an adjacently positioned hinge barrel of the other section, with the inner ends of the cylindrical sleeves being secured against rotation within inner hinge barrels of opposite sections, thereby pivotally securing the upper and lower sections together,
and one of a pair of oppositely wound helical springs positioned in each cylindrical sleeve with the inner end of each sleeve being secured against rotation within its respective sleeve, and with the outer ends of the springs being secured against rotation within outer hinge barrels of opposite sections,
and means to adjust the tension of the springs.

2. A splash guard according to claim 1, wherein the upper section has means for securement to a vehicle.

3. A splash guard or mud guard according to claim 1 wherein the springs are under tension, the tension of one spring being opposite to the tension in the other spring.

4. A splash guard according to claim 1 wherein the inner ends of the springs are secured against rotation within their respective sleeves, and the inner ends of the sleeves are secured against rotation within respective inner hinge barrels of opposite sections by pins or rivets passing through holes provided in the inner hinge barrels and the sleeves, and through loops provided on the inner ends of the springs.

5. A splash guard according to claim 4, wherein the inner ends of the sleeves are provided with a series of circumferentially spaced openings to selectively receive the pins or rivets passing through the inner hinge barrels.

6. A splash guard or mud guard for vehicles according to claim 1 wherein loops formed in outermost ends of the springs are received within inwardly opening slots provided in cylindrical plugs positioned within the outer ends of the outer hinge barrels, the outer surfaces of the plugs having slots enabling rotation thereof to adjust the tension of the springs and to receive pins or rivets passing through the outer hinge barrels to secure the plugs against rotation with respect to their respective hinge barrels after the tension adjustment.

7. A splash guard for vehicles comprising
an upper section and a lower section pivotally secured together,
the lower edge of the upper section and the upper edge of the lower section having hollow cylindrical hinge barrels in parallel adjacent relationship with an oppositely wound helical spring positioned longitudinally within each hinge barrel,
one end of one spring being secured against rotation within its hinge barrel with the opposite end of the other spring being secured against rotation within its hinge barrel,
and end caps closing adjacent ends of the parallel hinge barrels, the ends of the springs not secured within the hinge barrels being secured to the end caps to hold the end caps in position.

* * * * *